No. 742,963. Patented November 3, 1903.

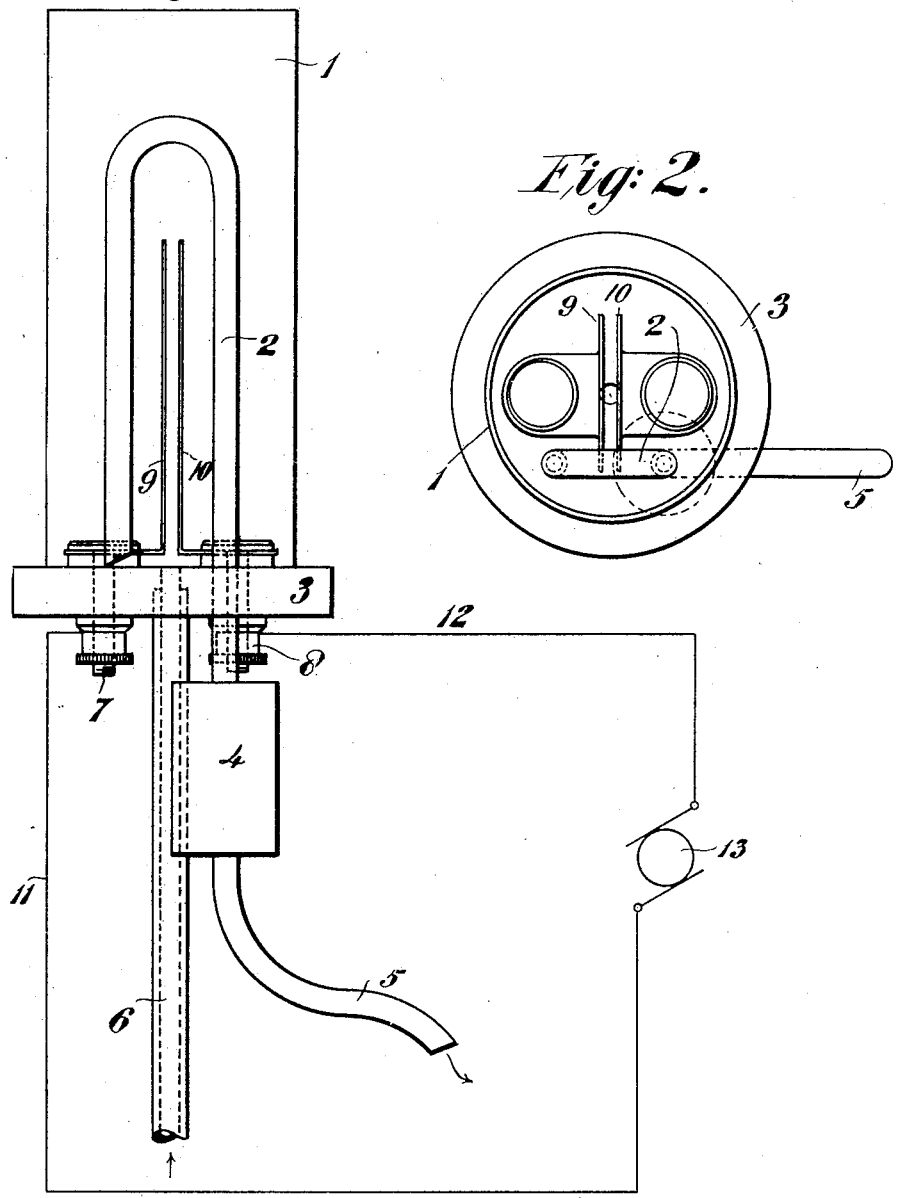
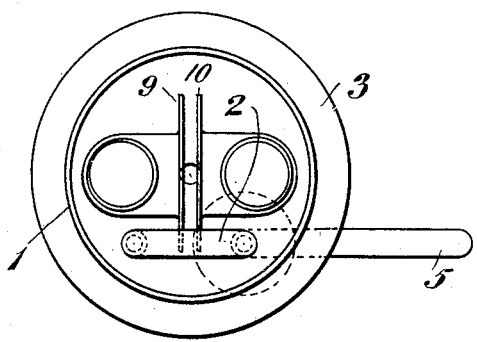

UNITED STATES PATENT OFFICE.

FRANK BRIGGS, OF TORQUAY, ENGLAND.

ELECTRIC HEATER FOR LIQUIDS.

SPECIFICATION forming part of Letters Patent No. 742,963, dated November 3, 1903.

Application filed August 23, 1902. Serial No. 120,805. (No model.)

*To all whom it may concern:*

Be it known that I, FRANK BRIGGS, a subject of the King of Great Britain, residing at Park Crescent, Torquay, in the county of Devon, England, have invented a new and useful Improved Electric Heater for Liquids, of which the following is a specification.

My invention relates to an improved appliance for rapidly heating water or other liquids by means of the electric current.

The device has been designed especially with a view to supplying a quantity of heated water for the purposes of a dentist, but may obviously be utilized for any other purpose in which it is desirable rapidly to heat a quantity of liquid.

My invention is illustrated in the accompanying drawings, in which—

Figure 1 represents a side elevation, and Fig. 2 a plan.

The receptacle 1 is of any convenient size or form and may either be filled from the top or the bottom, or otherwise, or kept continuously full by any well-known or convenient device. The means for withdrawing the heated water from the vessel may also be of any convenient kind. That shown in the drawings consists of the siphon 2, drawing its supply from the bottom of the vessel and delivering it through the base-plate or support 3 to a filter 4, which is conveniently arranged, as shown, for the purpose of intercepting any precipitate which may be formed in some waters during the operation of heating; but the filter may also be placed on the inlet, if found preferable. From the filter a pipe 5, usually provided with a suitable stopcock, delivers the filtered liquid to the desired point. The liquid-inlet designed in the drawings is that indicated at 6. Two terminals 7 and 8 are connected to the current-wires 11 12 of a source of electricity 13, and through them the current passes into the plates or wires or other equivalent devices 9 and 10. These plates or the like are placed in proximity to one another, as shown, and so that the circuit is closed through the liquid, the resistance of which to the passage of the electric current rapidly heats the liquid between the plates and then the surrounding liquid.

In cases where liquid other than water is to be heated I may find it advisable to dispense with the filter device, as also in cases in which the heated water is not required for drinking. I do not limit myself to the precise construction of electric heater shown in the drawings, although this is found by experience to be a convenient and economical type.

It is essential in every case to arrange the apparatus in such a manner that no current can pass when the apparatus is empty, the water or other liquid forming the circuit-closing medium.

What I claim is—

1. In an electric heater for liquids, a receptacle, electrodes in said receptacle, connections to said electrodes from a source of electric energy, means for supplying liquid to said receptacle and a siphon for withdrawing the said liquid when sufficiently heated by the passage of electric current through it between the electrodes and thereby interrupting the electric circuit, substantially as set forth.

2. In an electric heater for liquids, an insulating-receptacle, incorrodible electrodes in said receptacle connected to a source of electricity and separated one from another by an air-break, an inlet-tube adapted to deliver liquid into the receptacle between the electrodes, and a siphon-outlet adapted to empty the receptacle of the liquid heated by the passage of current between the electrodes and thereby interrupt the electric circuit, substantially as set forth.

In testimony whereof I have signed my name to this specification in the presence of two subscribing witnesses.

FRANK BRIGGS.

Witnesses:
ROBERT PAUL KITSON,
WILLIAM JOHN TAYLOR.